United States Patent
Fujiwara et al.

(10) Patent No.: US 10,458,513 B2
(45) Date of Patent: Oct. 29, 2019

(54) DAMPER DEVICE

(71) Applicant: AISIN SEIKI KABUSHIKI KAISHA, Kariya-shi, Aichi (JP)

(72) Inventors: Takuya Fujiwara, Anjo (JP); Makoto Komuro, Kariya (JP); Suguru Jimbo, Tokai (JP); Kosuke Kondo, Kariya (JP); Masahiko Kobayashi, Anjo (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 23 days.

(21) Appl. No.: 15/743,890

(22) PCT Filed: Mar. 30, 2016

(86) PCT No.: PCT/JP2016/060402
§ 371 (c)(1),
(2) Date: Jan. 11, 2018

(87) PCT Pub. No.: WO2017/010130
PCT Pub. Date: Jan. 19, 2017

(65) Prior Publication Data
US 2018/0202515 A1 Jul. 19, 2018

(30) Foreign Application Priority Data

Jul. 14, 2015 (JP) ................. 2015-140521

(51) Int. Cl.
F16F 15/14 (2006.01)
F16F 15/131 (2006.01)
F16H 45/02 (2006.01)

(52) U.S. Cl.
CPC .... F16F 15/1457 (2013.01); F16F 15/13128 (2013.01); F16F 15/145 (2013.01); F16F 15/1414 (2013.01); *F16H 2045/0263* (2013.01)

(58) Field of Classification Search
CPC ............ F16F 15/1457; F16F 15/13128; F16F 15/1414; F16F 15/145; F16F 15/14; F16H 2045/0263
See application file for complete search history.

(56) References Cited

U.S. PATENT DOCUMENTS 8,910,762 B2 * 12/2014 Takikawa .............. F16F 15/145
188/378
8,925,420 B2 * 1/2015 Wysgol ................. F16F 15/145
74/574.2

(Continued)

FOREIGN PATENT DOCUMENTS

CN 103261733 A 8/2013
DE 10 2006 028 552 A1 5/2007

(Continued)

OTHER PUBLICATIONS

Office Action (Notification of the First Office Action) dated Feb. 19, 2019, by the China National Intellectual Property Administration in corresponding Chinese Patent Application No. 201680040661.4 and an English Translation of the Office Action. (14 pages).

(Continued)

*Primary Examiner* — Thomas C Diaz
(74) *Attorney, Agent, or Firm* — Buchanan Ingersoll & Rooney PC

(57) ABSTRACT

A damper device according to one embodiment, for example, includes: a rotating member that is rotatable about a rotational axis, the rotating member including a base portion that is plate-like and support portions that is attached to the base portion and extends in an axial direction of the rotational center; and a plurality of weight members disposed partially overlapping each other in the axial direction, the weight members being provided with tracks in respective overlapped parts of the weight members, the tracks guiding the support portion to be swingable with respect to the (Continued)

rotating member, wherein the support portion is shared in the tracks provided in the weight members.

8 Claims, 8 Drawing Sheets

(56) References Cited

U.S. PATENT DOCUMENTS

| | | | | |
|---|---|---|---|---|
| 9,243,681 B2* | 1/2016 | Movlazada | ........... | F16F 15/145 |
| 2012/0055281 A1* | 3/2012 | Huegel | ................ | F16F 15/145 |
| | | | | 74/574.2 |
| 2013/0283966 A1* | 10/2013 | Baral | ................... | F16F 15/145 |
| | | | | 74/574.2 |
| 2015/0285332 A1 | 10/2015 | Kram et al. | | |

FOREIGN PATENT DOCUMENTS

| | | |
|---|---|---|
| DE | 10 2011 086 436 A1 | 6/2012 |
| WO | 2014/067728 A1 | 5/2014 |

OTHER PUBLICATIONS

International Search Report (PCT/ISA/210) dated May 17, 2016, by the Japanese Patent Office as the International Searching Authority for International Application No. PCT/JP2016/060402.
Written Opinion (PCT/ISA/237) dated May 17, 2016, by the Japanese Patent Office as the International Searching Authority for International Application No. PCT/JP2016/060402.

* cited by examiner

DAMPER DEVICE

CROSS-REFERENCE TO RELATED APPLICATIONS

This application is national stage application of International Application No. PCT/JP2016/060402, filed Mar. 30, 2016, which designates the United States, incorporated herein by reference, and which is based upon and claims the benefit of priority from Japanese Patent Application No. 2015-140521, filed Jul. 14, 2015, the entire contents of which are incorporated herein by reference.

TECHNICAL FIELD

Embodiments of the present invention relate to a damper device.

BACKGROUND ART

Conventionally, there has been known a damper device that includes: a plurality of weight members each having a track; and a rotating member having a plurality of support portions attached thereto the number of which corresponds to the number of such tracks of the weight members.

CITATION LIST

Patent Literature

Patent Literature 1: German Laid-open Patent Publication No. 102011086436

SUMMARY OF INVENTION

Problem to be Solved by the Invention

In a damper device as described above, for example, it is desirable to attain a novel configuration that can more readily reduce labor and cost needed for manufacturing.

Means for Solving Problem

A damper device according to one embodiment, for example, comprises: a rotating member that is rotatable about a rotational center, the rotating member comprising a base portion that is plate-like, and a support portion that is attached to the base portion and extends in an axial direction of the rotational center; and a plurality of weight members disposed partially overlapping each other in the axial direction, the weight members being provided with tracks in respective overlapped parts of the weight members, the tracks guiding the support portion to be swingable with respect to the rotating member, wherein the support portion is shared in the tracks provided in the weight members. Thus, for example, labor and cost needed for manufacturing the damper device can be readily reduced.

In the above-described damper device, for example, the weight members are disposed displaced from each other in a circumferential direction of the rotational center, and the support portion is shared in the tracks provided in two of the weight members adjacent to each other in the circumferential direction. Thus, for example, the configuration having these weight members displaced from each other in the circumferential direction enables the damper device to be obtained in which the support portion is sharable.

In the above-described damper device, for example, each of the weight members comprises an intermediate portion that is positioned to one side of the base portion in the axial direction, and two end portions that are formed thinner than the intermediate portion in the axial direction and extend to both sides in the circumferential direction from axially displaced positions in the intermediate portion, and one of the two end portions on one side in the circumferential direction of one of the two adjacent weight members and the other one of the two end portions on the other side in the circumferential direction of the other one of the two adjacent weight members overlap each other in the axial direction. Thus, size increase of the damper device in the axial direction thereof can be readily avoided as compared with a configuration in which, for example, two weight members that have thicknesses uniform in the axial direction overlap each other in the axial direction.

In the above-described damper device, for example, each of the weight members comprises a first component that forms a part of the intermediate portion and the one of the two end portions on the one side in the circumferential direction, and a second component that forms a part of the intermediate portion and the other one of the two end portions on the other side in the circumferential direction and that partially overlaps the first component in the axial direction, and the first component and the second component are formed in shapes identical to each other. Thus, the configuration of the weight member that includes the two end portions displaced from each other in the axial direction and the intermediate portion can be readily produced relatively easily or less costly.

In the above-described damper device, for example, the weight members comprises a plurality of first weight members that are disposed displaced from each other in the circumferential direction on one side in the axial direction of the base portion, and a plurality of second weight members that are disposed side by side with the first weight members in the axial direction and displaced from each other in the circumferential direction on the other side in the axial direction of the base portion, and in the first weight member and the second weight member that are disposed side by side in the axial direction, an order of arrangement of the first component and the second component of the first weight member in the axial direction and an order of arrangement of the first component and the second component of the second weight member in the axial direction are reverse to each other. Thus, for example, the gravity centers of the first weight member and the second weight member can be disposed closer to a central part of the base portion in the axial direction than otherwise by the configuration such that the first component and the second component of the first weight member are axially arranged in an order reverse to an order in which the first component and the second component of the second weight member are axially arranged. Thus, for example, vibration due to rotation of the damper device is further less likely to occur.

In the above-described damper device, for example, the rotating member comprises a protruding portion that protrudes from the base portion and comprises a convex curved surface formed as a cylindrical surface around the rotational center, at least one of the weight members comprises a concave curved surface that is capable of contacting and fitting the convex curved surface from outside in the radial direction of the rotational axis, and a range of movement of the support portion along the tracks is restricted by contact between the convex curved surface and the concave curved surface. Thus, for example, the convex curved surface and the concave curved surface contact each other in respective regions thereof along the circumferential direction, which makes it possible to more readily prevent the support portion and edge portions of the tracks from contacting each other, and consequently makes it possible to prevent hitting sound, abrasion, and the like caused by contact between the support portion and the edge portions of the tracks.

In the above-described damper device, for example, at least one of the weight members comprises, as the concave curved surface, two concave curved surfaces that are positioned displaced from each other in the circumferential direction of the rotational center, movement of the support portion toward one direction along the tracks is restricted by contact between the convex curved surface and one of the two concave curved surfaces, and movement of the support portion toward the other direction along the tracks is restricted by contact between the convex curved surface and the other one of the two concave curved surfaces. Thus, for example, the support portion and the edge portions of the tracks can be further prevented from contacting each other by contact between the two concave curved surfaces and the convex curved surface.

In the above-described damper device, for example, the weight members comprises respective concave curved surfaces as the concave curved surface, and the convex curved surface is shared by the concave curved surfaces of the weight members. Thus, the protruding portion and consequently the rotating member can be readily formed in simpler shapes as compared to a configuration in which the rotating member has the convex curved surfaces corresponding to the respective concave curved surfaces of the weight members. Thus, for example, labor and cost needed for manufacturing the damper device can be readily reduced.

DESCRIPTION OF EMBODIMENTS

The following discloses exemplary embodiments of the present invention. Configurations of the embodiments and operations, results, and effects achieved thereby to be described below are illustrative only. The present invention can be implemented by any configuration other than the configurations disclosed in the following embodiments. Additionally, the present invention can achieve at least one of the various effects achieved by the configurations.

The embodiments disclosed below include similar elements to each other. Such elements are assigned the same reference letters or numerals, and duplicate descriptions thereof will be omitted.

First Embodiment

Figure 1:
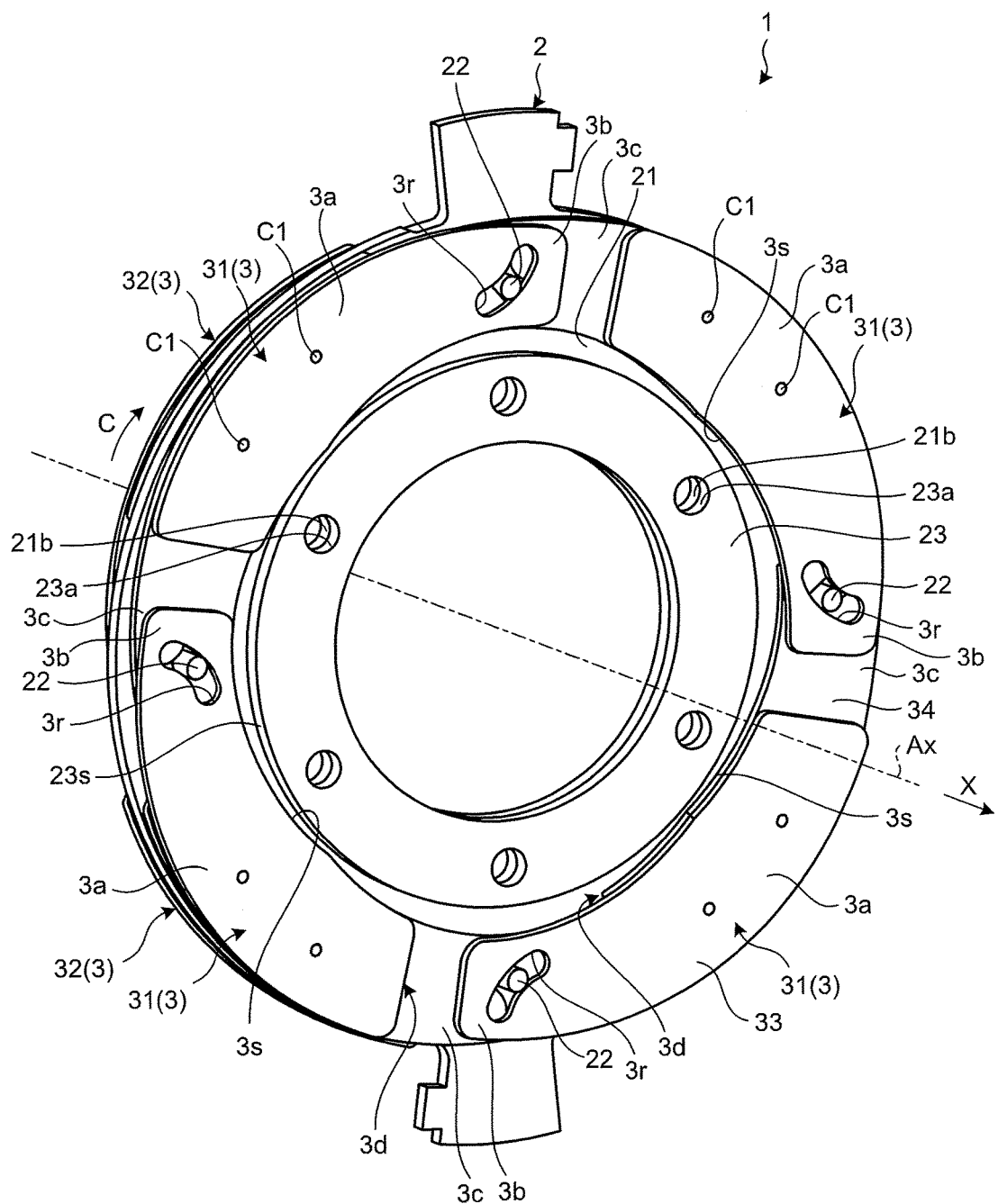
FIG. 1 is an exemplary perspective view of a damper device according to a first embodiment.

As illustrated in FIG. 1, a damper device 1 includes, for example, a rotating member 2 and a plurality of weight members 3. A damper device 1 is provided, for example, between an output shaft of an engine on the input side and an input shaft of a transmission on the output side, and reduces torque fluctuations and torsional vibrations caused by torsion between the output shaft and the input shaft. The damper device 1 can be referred to also as a torque fluctuation absorbing apparatus. The damper device 1 not only can be provided between the engine and the transmission, but can also be provided, for example, between any other two rotating elements such as the engine and a motor generator. Further, the damper device 1 can be provided in, for example, any one of various types of vehicle such as a hybrid vehicle or in a machine including a rotating element.

The rotating member 2 is provided so as to be rotatable about a rotational axis Ax illustrated in FIG. 1. The rotational axis Ax is an example of a rotational center. The rotational axis Ax substantially agrees with, for example, the output shaft of the engine and the input shaft of the transmission. The following description, the terms "axial direction", "radial direction", and "circumferential direction" mean an axial direction of the rotational axis Ax, a radial direction of the rotational axis Ax, and a circumferential direction of the rotational axis Ax, respectively. In the drawings, the arrow X indicates one of the axial directions, the arrow R indicates the outward radial direction, and the arrow C indicates one of the circumferential directions.

Figure 4:
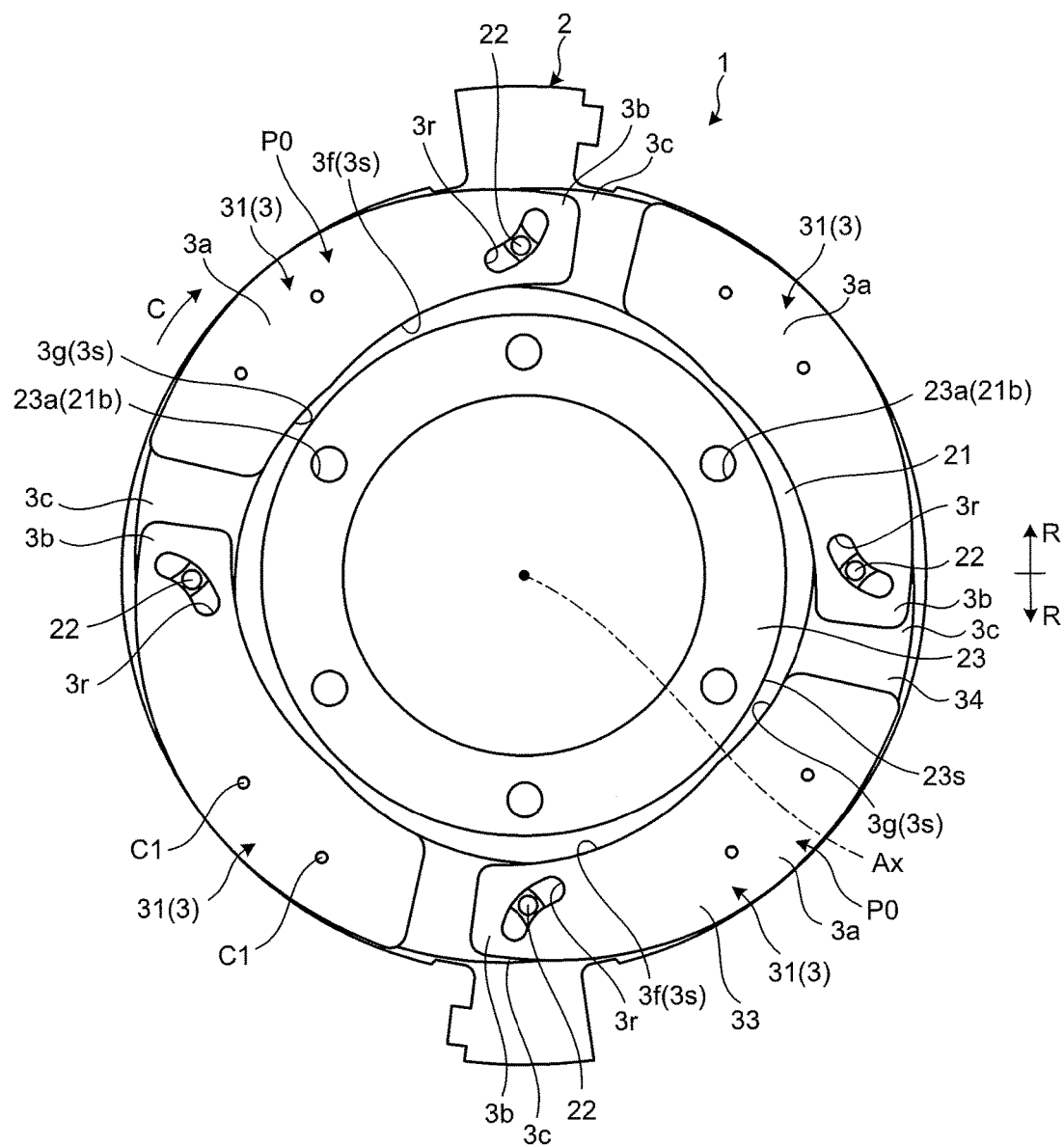
FIG. 4 is an exemplary front view of the damper device in which the weight members are at neutral positions, according to the first embodiment.

As illustrated in FIGS. 1 and 4, the rotating member 2 is formed in an annular shape around the rotational axis Ax and in a plate-like shape extending in the radial direction (a direction R) and the circumferential direction (a direction C), that is, in a plate-like shape the normal direction of which is parallel to the rotational axis Ax. The rotating member 2 is, for example, a driven plate that is connected with a rotating element of the transmission. The rotating member 2 is not limited to being a driven plate and may be, for example, a drive plate that is connected with a rotating element of the engine or another rotating body that can be disposed between the engine and the transmission. The drive plate and the driven plate are examples of elements of a damper portion included in the damper device 1.

The weight members 3 are each formed in an arc-like shape extending in the circumferential direction and in a plate-like shape extending in the radial direction (the direction R) and the circumferential direction (the direction C), that is, a plate-like shape the normal direction of which is parallel to the rotational axis Ax. In the present embodiment, for example, four weight members 3 are attached to support portions 22 of the rotating member 2 while being arranged next to each other in the circumferential direction. Each of the weight members 3 can be referred to also as a mass body, an inertia body, a swing body, a pendulum, or the like. The weight members 3 are examples of elements of a dynamic absorber included in the damper device 1. In a dynamic damper portion functioning as a dynamic absorber, torsional vibration can be reduced, for example, in a manner such that: the rotating member 2 rotates about the rotational axis Ax; centrifugal force is thereby generated; and each of the weight members 3 pendulums relative to the rotating member 2.

Figure 2:
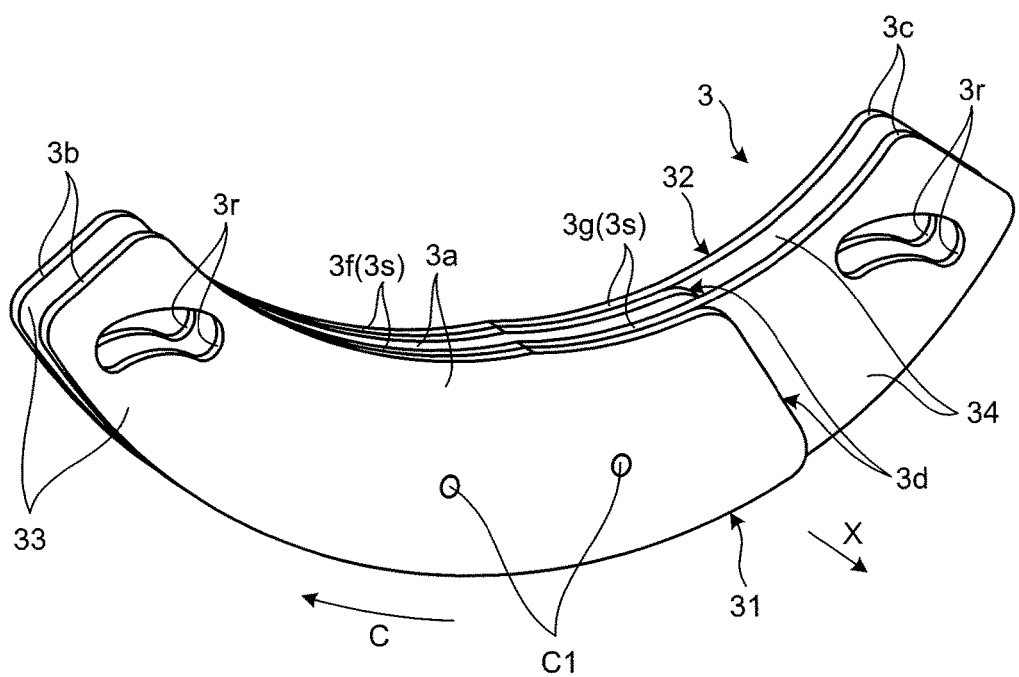
FIG. 2 is an exemplary perspective view of a weight member of the damper device according to the first embodiment.
Figure 3:
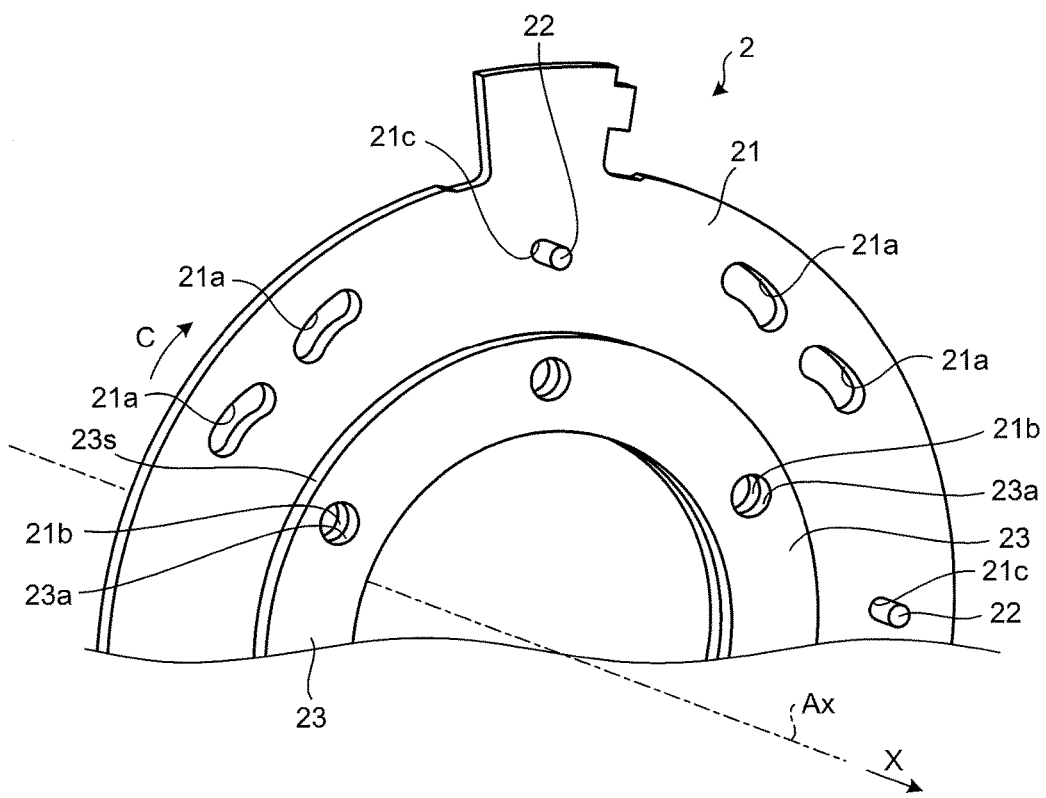
FIG. 3 is an exemplary perspective view of a part of a rotating member of the damper device according to the first embodiment.

As illustrated in FIG. 3, for example, the rotating member 2 includes a base portion 21, the support portions 22, and a protruding portion 23. The base portion 21 is formed, for example, in an annular and plate-like shape intersecting the rotational axis Ax and stretching in the radial direction. In the base portion 21, a plurality of openings 21a spaced apart from each other in the circumferential direction (the direction C) are provided. Each of the openings 21a is formed, for example, as a hole elongated in the circumferential direction of the rotational axis Ax. In the openings 21a, couplers C1 of the weight members 3 illustrated in FIGS. 1 and 2 are inserted. The openings 21a function, for example, as clearance holes of the couplers C1 and allow the weight members 3 and the rotating member 2 to move relative to each other. As illustrated in FIG. 3, an opening 21b is provided in the base portion 21 at a position that is inward in the radial direction from the openings 21a of the base portion 21, and an opening 21c is provided in the base portion 21 at a position not corresponding to that of the openings 21a of the base portion 21 in the circumferential direction. The openings 21b and 21c are, for example, through-holes penetrating the base portion 21 in the axial direction.

Each of the support portions 22 is formed, for example, as a columnar and rod-like component extending in the axial direction of the rotational axis Ax (the direction X). The support portions 22 can be coupled to the openings 21c of the base portion 21, for example, by press-fitting or bonding. Thus, the support portions 22 rotate about the rotational axis Ax integrally with the base portion 21, and are not rotatable relative to the base portion 21. As illustrated in FIG. 1, in the present embodiment, four support portions 22 are provided at regular intervals in the circumferential direction (the direction C), for example. The support portions 22 are attached while penetrating the base portion 21 in the axial direction, and protrude from both sides of the base portion 21 in the axial direction.

The protruding portion 23 is formed, for example, of a component that is annular about the axial direction of the rotational axis Ax and that is plate-like. As illustrated in FIG. 3, the diameter of the protruding portion 23 is smaller than the diameter of the base portion 21. The protruding portion 23 is placed over a radially inner part of the base portion 21 in the axial direction (the direction X). The protruding portion 23 has a plurality of openings 23a spaced apart from each other in the circumferential direction (the direction C). The base portion 21 and the protruding portion 23 are coupled to each other by couplers not illustrated that penetrate the corresponding openings 21b and 23a in the axial direction. Thus, the protruding portion 23 rotates integrally with the base portion 21 about the rotational axis Ax.

The protruding portion 23 has a convex curved surface 23s that faces radially inward surfaces 3s of the weight members 3 illustrated in FIGS. 1 and 2. The convex curved surface 23s is a radially outward surface of the protruding portion 23 and is formed, for example, as a cylindrical surface about the rotational axis Ax. In the present embodiment, the protruding portion 23 is formed, for example, of a soft material such as rubber or resin. The protruding portion 23 is an example of a damping member. The present embodiment illustrates, but is not limited to, a configuration in which the base portion 21 and the protruding portion 23 are formed of different components. For example, the base portion 21 and the protruding portion 23 may be formed as the same component. In this configuration, the base portion 21 and the protruding portion 23 may be formed of, for example, rubber or resin, or may be formed of, for example, a metal material with a cylindrical damping member attached on the outer circumferential portion of the protruding portion 23.

As illustrated in FIG. 2, for example, the weight members 3 includes first weight members 31 and second weight members 32. As illustrated in FIG. 1, while the first weight members 31 are positioned on one side of the axial direction (the direction X) of the base portion 21, the second weight members 32 are positioned on the other side of the base portion 21 in the axial direction. One first weight member 31 and one second weight member 32 that are disposed side by side in the axial direction are coupled to each other via the couplers C1, such as rivets, each penetrating these members in the axial direction. Thus, the first weight member 31 and the second weight member 32 integrally swing relative to the rotating member 2. The present embodiment illustrates, but is not limited to, a configuration in which one first weight member 31 and one second weight member 32 are integrated. For example, the first weight member 31 and the second weight member 32 may be unintegrated from each other and rotate relative to the rotating member 2 independently from each other.

As illustrated in FIG. 2, the first weight members 31 and the second weight members 32 each have an intermediate portion 3a and two end portions 3b and 3c. The intermediate portion 3a is a centrally positioned part of each of the first weight members 31 and the second weight members 32 in the circumferential direction (the direction C). As illustrated also in FIG. 1, in the present embodiment, the thickness of the intermediate portion 3a in the axial direction (the direction X) is larger than the thicknesses of the end portions 3b and 3c in the axial direction. The intermediate portion 3a can be referred to also as a basal portion, a thick portion, a connecting portion, an overlapping portion, or the like.

While the end portion 3b is a part of each of the first weight member 31 and the second weight member 32 on one side thereof in the circumferential direction (the direction C), the end portion 3c is a part of each of the first weight member 31 and the second weight member 32 on the other side thereof in the circumferential direction. In the present embodiment, the respective thicknesses of the end portions 3b and 3c in the axial direction (the direction X) are substantially the same as each other. These two end portions 3b and 3c extend from positions of the intermediate portion 3a oppositely in the circumferential direction, the positions being displaced from each other in the axial direction. Each of the end portions 3b and 3c can be referred to also as a protruding portion, a hanging portion, a thin portion, or the like. As illustrated in FIGS. 1 and 2, in the present embodiment, the two end portions 3b and 3c are displaced from each other in the axial direction, so that a step portion 3d is formed between the intermediate portion 3a and each of the end portions 3b and 3c, the step portion 3d being indented in the axial direction by an amount corresponding to the thickness of the other of the end portions 3b and 3c.

As illustrated in FIG. 2, in the present embodiment, a track 3r that guides one of the support portions 22 is provided to each of the end portions 3b and 3c. The track 3r is, for example, an elongated hole that extends in a curve as viewed in the axial direction (the direction X) and that is convex inward in the radial direction of the corresponding weight member 3. As illustrated in FIG. 1, the weight members 3 are attached to the rotating member 2 with the support portions 22 penetrating the corresponding tracks 3r in the axial direction. The support portions 22 relatively move along the corresponding tracks 3r, which allows the weight members 3 to swing relative to the rotating member 2 within a range of the longitudinal direction of the corresponding track 3r.

As illustrated in FIG. 2, in the present embodiment, the first weight members 31 and the second weight members 32 each include a plurality of components combined together. Specifically, the first weight members 31 and the second weight members 32 each include a first component 33 and a second component 34. The first component 33 is positioned on one side of each of the first weight members 31 and the second weight members 32 in the axial direction (the direction X), and the second component 34 is positioned on the other side of the first component in the axial direction. The first component 33 includes at least the end portion 3b and a part of the intermediate portion 3a, and the second component 34 includes at least the end portion 3c and a part of the intermediate portion 3a.

In the present embodiment, for example, the first component 33 and the second component 34 are formed as identical components. That is, the shape of the first component 33 is the same as the shape of the second component 34, and the specifications of the first component 33 are the same as the specifications of the second component 34. In the present embodiment, the first component 33 and the second component 34 are each formed in a plate-like shape and an arc-like shape extending in the circumferential direction (the direction C). The tracks 3r are provided in the end portions 3b and 3c on one side of the first component 33 and the second component 34 in the circumferential direction, respectively.

As illustrated in FIG. 2, the first weight member 31 and the second weight member 32 are overlapped on each other in the axial direction in a manner such that the first components 33 and the second components 34 are oriented reversely from each other, that is, in a manner such that the tracks 3r of the first components 33 are positioned on one side in the circumferential direction and the tracks 3r of the second components 34 are positioned on the other side in the circumferential direction. Each of the first components 33 and the corresponding second component 34 are disposed displaced from each other in the circumferential direction (the direction C) and partially overlap each other in the axial direction (the direction X). In the present embodiment, the intermediate portion 3a is formed of a part in which one first component 33 and one second component 34 overlap each other in the axial direction, and the two end portions 3b and 3c are formed of parts in which the first component 33 and the second component 34 do not overlap each other in the axial direction.

In the weight member 3, for example, the first weight member 31 and the second weight member 32 are integrated with each other via the couplers C1 in a state such that: the two tracks 3r provided in the end portions 3b of the first weight member 31 and the second weight member 32 overlap each other in the axial direction (the direction X); and the two tracks 3r provided in the end portions 3c of the first weight member 31 and the second weight member 32 overlap each other. In the present embodiment, the weight member 3 is attached to the rotating member 2 with the support portions 22 penetrating the corresponding two tracks 3r of the first weight member 31 and the second weight member 32 in the axial direction.

In the present embodiment, as illustrated in FIG. 1, the end portions 3b of one of the two weight members 3 adjacent to each other in the circumferential direction (the direction C) and the end portions 3c of the other of the two weight members 3 are disposed overlapping one another in the axial direction (the direction X). In the present embodiment, as illustrated also in FIG. 4, one support portion 22 is shared in the tracks 3r provided in these overlapping end portions 3b and 3c. If the number of such support portions 22 attached to the rotating member 2 corresponds to all of the tracks 3r in all of the weight members 3, the damper device 1 would possibly have an increased number of components. In that regards, according to the present embodiment, one support portion 22 can be shared in the tracks 3r provided in the weight members 3, so that the number of such support portions 22 and consequently the number of components of the damper device 1 can be readily reduced. Thus, for example, labor and cost needed for manufacturing the damper device 1 can be readily reduced.

In the present embodiment, as illustrated in FIG. 1, the end portions 3b and the end portions 3c are overlapped one another in the axial direction in a state such that: each of the end portions 3b, which is thinner than the intermediate portion 3a of one of the two weight members 3 that are adjacent to each other, and one of the end portions 3c, which is thinner than the intermediate portion 3a of the other one of the two weight members 3, are positioned in opposed sides in the axial direction. Consequently, the intermediate portions 3a of the weight members 3 can be arranged next to each other in the circumferential direction with no or smaller unevenness than otherwise. The damper device 1 would possibly inevitably have an increased size in the axial direction thereof if two weight members 3 having the same thickness are disposed overlapping each other in the axial direction. In that regards, according to the present embodiment, the configuration and disposition described above of the intermediate portion 3a and the end portions 3b and 3c keep the damper device 1 from having an increased size in the axial direction thereof.

In the present embodiment, as illustrated in FIG. 2, each inner surface 3s of the weight member 3 in the radial direction includes two concave curved surfaces 3f and 3g. The two concave curved surfaces 3f and 3g are positioned displaced from each other in the circumferential direction (the direction C) and are each shaped to fit the form of the convex curved surface 23s of the protruding portion 23. The two concave curved surfaces 3f and 3g can contact the convex curved surface 23s from outside in the radial direction of the rotational axis Ax. In the present embodiment, the weight members 3 are formed to be swingable relative to the rotating member 2 between a first position P1 illustrated in FIG. 5, a second position P2 illustrated in FIG. 6, and a neutral position P0 illustrated in FIG. 4.

Figure 5:
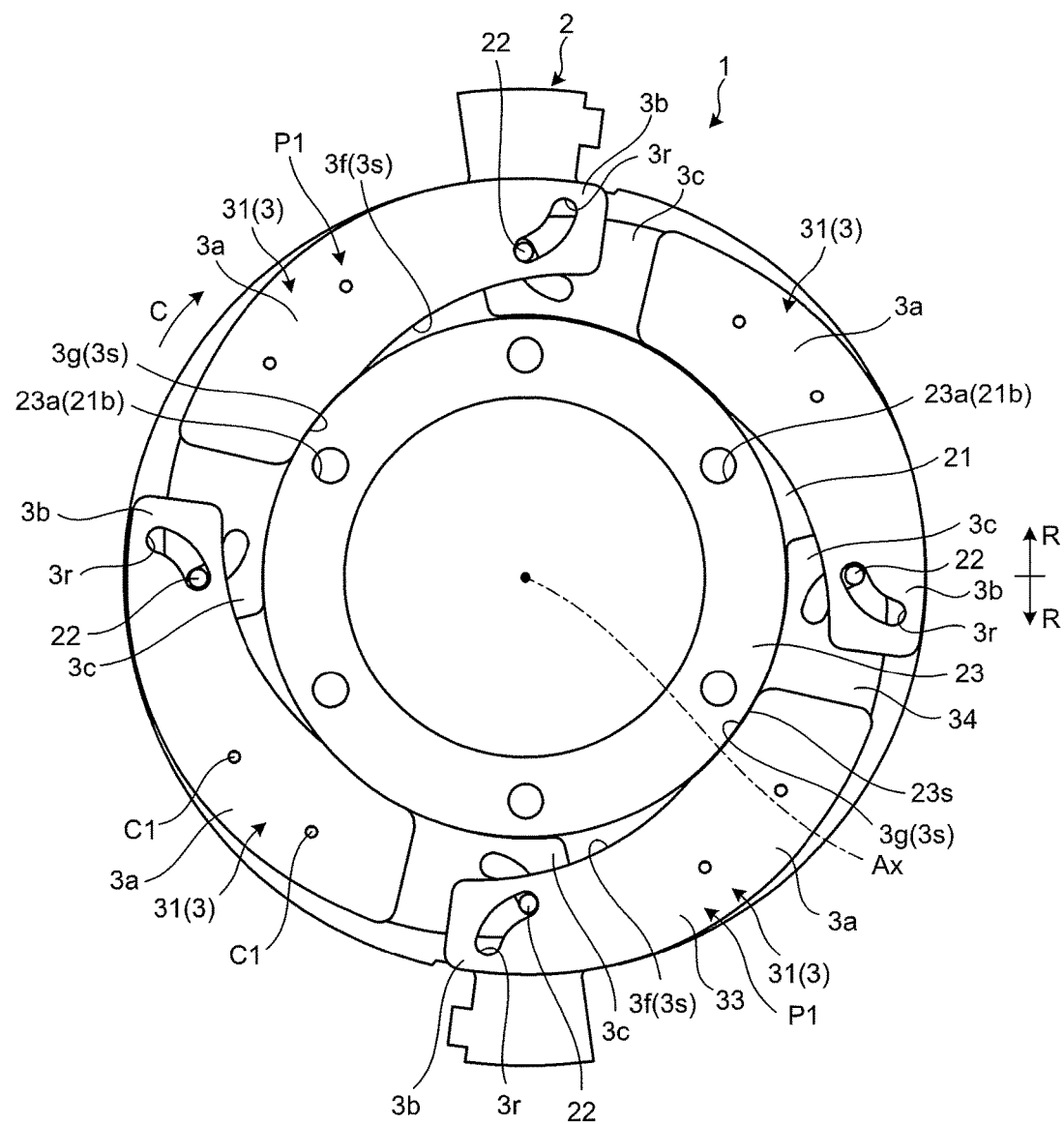
FIG. 5 is an exemplary front view of the damper device in which the weight members are at first positions, according to the first embodiment.

As illustrated in FIG. 5, when the weight members 3 are at the first position P1, the concave curved surfaces 3g of the weight members 3 and the convex curved surface 23s of the protruding portion 23 contact each other in a manner fitting each other. Movement of the weight members 3 relative to the rotating member 2 along the corresponding tracks 3r toward one end thereof is restricted by contact between the concave curved surfaces 3g and the convex curved surface 23s. The first position P1 can be referred to also as a first restriction position or the like. When the weight members 3 are at the first position P1, the support portions 22 each face an edge portion of the corresponding tracks 3r on one end thereof in the longitudinal direction thereof with a narrow gap therebetween. That is, movement of the support portions 22 along the corresponding tracks 3r toward the one end in the longitudinal direction is restricted by contact between the concave curved surfaces 3g and the convex curved surface 23s.

Figure 6:
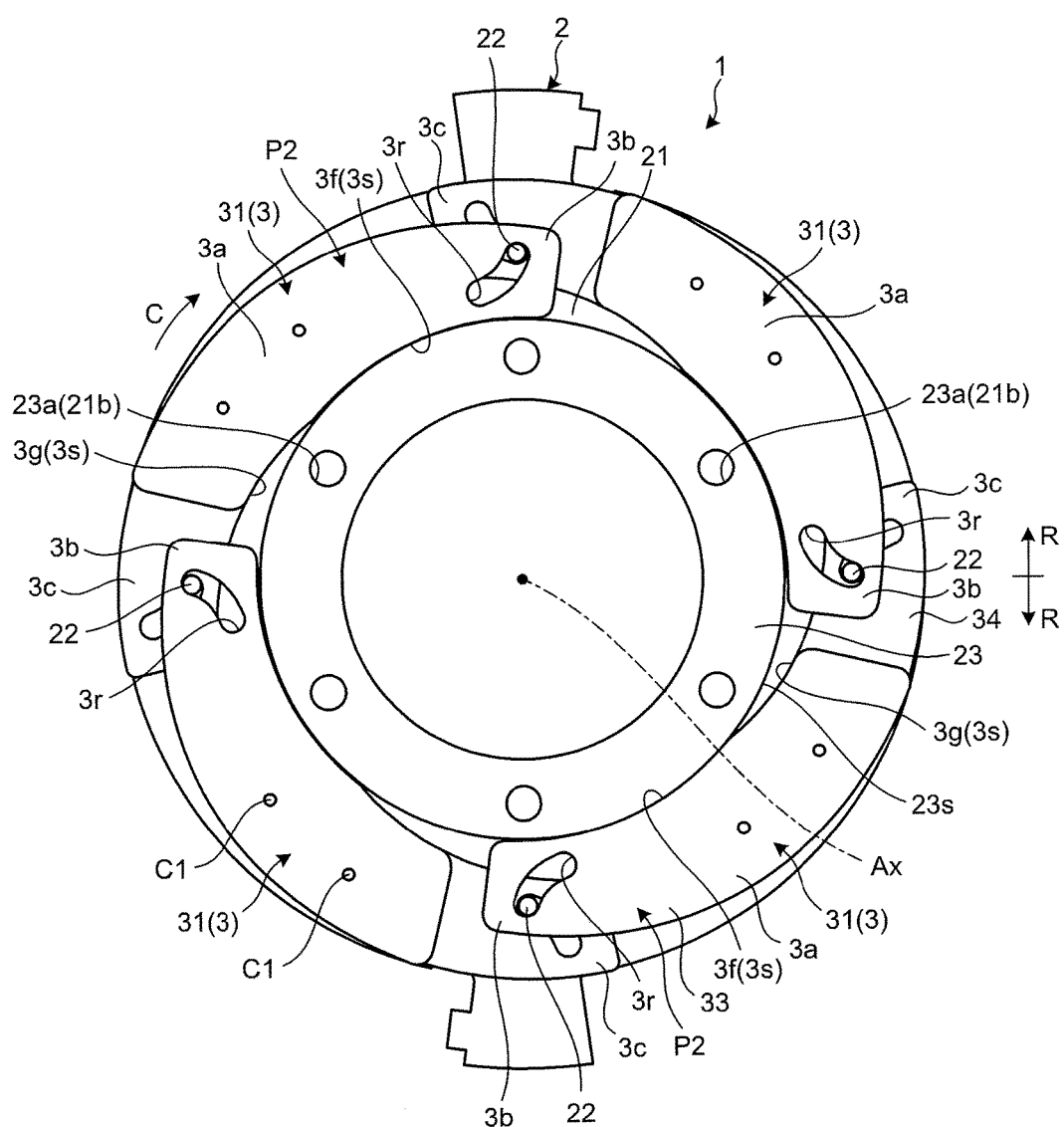
FIG. 6 is an exemplary front elevational view of the damper device in which the weight members are at second positions, according to the first embodiment.

As illustrated in FIG. 6, when the weight members 3 are at the second position P2, the concave curved surfaces 3f of the weight members 3 and the convex curved surface 23s of the protruding portion 23 contact each other in a manner fitting each other. Movement of the weight members 3 relative to the rotating member 2 along the corresponding tracks 3r toward the other end thereof is restricted by contact between the concave curved surfaces 3f and the convex curved surface 23s. The second position P2 can be referred to also as a second restriction position or the like. When the weight members 3 are at the second position P2, the support portions 22 each face an edge portion of the corresponding tracks 3r on the other end in the longitudinal direction thereof with a narrow gap therebetween. That is, movement of the support portions 22 along the corresponding tracks 3r toward the other end in the longitudinal direction is restricted by contact between the concave curved surfaces 3f and the convex curved surface 23s.

As illustrated in FIG. 4, when the weight members 3 are at the neutral position P0, the two concave curved surfaces 3f and 3g of each of the weight members 3 and the convex curved surface 23s of the protruding portion 23 are apart from each other. Thus, when the weight members 3 are at the neutral position P0, movement of the weight members 3 relative to the rotating member 2 along the corresponding tracks 3r toward one and the other ends thereof, that is, movement of the support portions 22 along the corresponding tracks 3r toward one and the other ends thereof, is permitted. The two concave curved surfaces 3f and 3g and the convex curved surface 23s constitute an example of a stopper mechanism. In the present embodiment, the range of movement of the support portions 22 in the longitudinal direction of the corresponding tracks 3r is thus restricted by the two concave curved surfaces 3f and 3g and the convex curved surface 23s. Thus, according to the present embodiment, the support portions 22 and edge portions of the corresponding tracks 3r tend more readily to be prevented from contacting each other. Consequently, hitting sound, abrasion, and the like caused by contact between the support portions 22 and the edge portions of the corresponding tracks 3r can be prevented.

As illustrated in FIGS. 5 and 6, in the present embodiment, the concave curved surfaces 3g and the convex curved surface 23s are in contact with each other in a manner fitting each other when the weight members 3 are at the first position P1, and the concave curved surfaces 3f and the convex curved surface 23s are in contact with each other in a manner fitting each other when the weight members 3 are at the second position P2. Thus, according to the present embodiment, the concave curved surfaces 3f and 3g and the convex curved surface 23s contact each other across a relatively large area, which makes it possible to more readily have a reduced surface pressure, and consequently makes it possible to prevent hitting sound, abrasion, and the like that are caused by contact between the concave curved surfaces 3f and 3g and the convex curved surface 23s. In the present embodiment, the protruding portion 23 is formed of a damping member made of rubber, resin, or the like. This configuration tends still more readily to prevent hitting sound, abrasion, and the like that are caused by contact between the concave curved surfaces 3f and 3g and the convex curved surface 23s. The present embodiment illustrates, but is not limited to, a configuration in which the protruding portion 23, that is, a damping member, is provided on the rotating member 2. For example, the protruding portion 23 may be provided on the weight members 3. In such a configuration, for example, the weight members 3 may be formed of the damping member, or may have an arc-like damping member attached to an inner circumferential portion of the weight members 3. As illustrated in FIGS. 1 and 3, the present embodiment illustrates, but is not limited to, a configuration in which the protruding portion 23 is provided on one side of the base portion 21 in the axial direction. The protruding portions 23 may be provided on both sides thereof in the axial direction.

As described above, in the present embodiment, for example, the damper device 1 includes: the rotating member 2 that is rotatable about the rotational axis Ax (rotational center), the rotating member 2 including the base portion 21 that is plate-like, and the support portions 22 that are attached to the base portion 21 and extend in the axial direction (the direction X) of the rotational axis Ax; and a plurality of weight members 3 that are disposed partially overlapping each other in the axial direction, in the overlapped part of which the tracks 3r guiding the support portions 22 to be swingable with respect to the rotating member 2 are provided. Each of the support portions 22 is shared in the tracks 3r that are provided in the weight members 3. Thus, according to the present embodiment, the number of such support portions 22 and consequently the number of components of the damper device 1 can be readily reduced as compared with a configuration in which the number of such support portions 22 attached to the base portion 21 of the rotating member 2 corresponds to all of the tracks 3r in all of the weight members 3. Thus, for example, labor and cost needed for manufacturing the damper device 1 can be readily reduced.

In the present embodiment, for example, the weight members 3 are disposed displaced from each other in the circumferential direction (the direction C) of the rotational axis Ax, and the support portions 22 are shared in the tracks 3r that are provided in adjacent ones of the weight members 3 in the circumferential direction. That is, in the present embodiment, each of the support portions 22 is shared by two of the first weight members 31 disposed displaced from one another in the circumferential direction on one side of the base portion 21 in the axial direction (the direction X), and two of the second weight members 32 arranged side by side with the corresponding first weight members 31 in the axial direction and disposed displaced from each other in the circumferential direction on the other side of the base portion 21 in the axial direction. Thus, according to the present embodiment, the configuration having the weight members 3 displaced from each other in the circumferential direction enables the damper device 1 to be obtained in which the support portions 22 are sharable. The present embodiment illustrates, but is not limited to, a configuration in which the weight members 3 are displaced from each other in the circumferential direction. For example, the support portions 22 may be shared in a configuration in which the weight members 3 are displaced from each other in the radial direction (the direction R). The present embodiment illustrates, but is not limited to, a configuration in which the support portions 22 are shared by the corresponding tracks 3r of two of the weight members 3. The support portions 22 may be shared by the corresponding tracks 3r of three or more of the weight members 3.

In the present embodiment, for example, each of the weight members 3 includes: the intermediate portion 3a that is positioned on one side of the base portion 21 in the axial direction (the direction X); and the two end portions 3b and 3c that are each formed thinner than the intermediate portion 3a in the axial direction and extend in opposite directions to each other in the circumferential direction (the direction C) from axially displaced positions of the intermediate portion 3a. The end portion 3b on one side in the circumferential direction of one of two weight members 3 and the end portion 3c on the other side in the circumferential direction of the other one of the two weight members 3 overlap each other in the axial direction. Thus, according to the present embodiment, size increase of the damper device 1 in the axial direction thereof can be readily avoided as compared with, for example, a configuration in which the two weight members 3 that have thicknesses uniform in the axial direction overlap each other in the axial direction.

In the present embodiment, for example, each of the weight members 3 includes: the first component 33 forming a part of the intermediate portion 3a and the end portion 3b on one side in the circumferential direction (the direction C); and the second component 34 forming a part of the intermediate portion 3a and the end portion 3c on the other side in the circumferential direction and partially overlapping the first component 33 in the axial direction (the direction X). The first component 33 and the second component 34 have the same shape. Thus, according to the present embodiment, the configuration of the weight members 3 each including the two end portions 3b and 3c displaced from each other in the axial direction and the intermediate portion 3a can be readily produced relatively readily or less costly.

In the present embodiment, for example, the rotating member 2 includes the protruding portion 23 protruding from the base portion 21 and having the convex curved surface 23s formed as a cylindrical surface around the rotational axis Ax, and at least one of the weight members 3 has the concave curved surfaces 3f and 3g that can contact the convex curved surface 23s from outside in the radial direction of the rotational axis Ax in a manner fitting the convex curved surface 23s. Movement of the support portions 22 toward one side along the corresponding tracks 3r is restricted by contact between the convex curved surface 23s and the concave curved surface 3f, and movement of the support portions 22 toward the other side along the corresponding tracks 3r is restricted by contact between the convex curved surface 23s and the concave curved surface 3g. Thus, according to the present embodiment, for example, the convex curved surface 23s and the concave curved surfaces 3f and 3g contact each other in regions thereof along the circumferential direction, which makes it possible to more readily prevent the support portions 22 and edge portions of the corresponding tracks 3r from contacting each other, and consequently makes it possible to prevent hitting sound, abrasion, and the like caused by contact between the support portion 22s and the edge portions of the corresponding tracks 3r.

In the present embodiment, for example, at least one of the weight members 3 has the two concave curved surfaces 3f and 3g positioned displaced from each other in the circumferential direction (the direction C). Movement of the support portions 22 toward one side along the corresponding tracks 3r is restricted by contact between the convex curved surface 23s and the concave curved surface 3f, and movement of the support portions 22 toward the other side along the corresponding tracks 3r is restricted by contact between the convex curved surface 23s and the concave curved surface 3g. Thus, according to the present embodiment, the support portions 22 and edge portions of the corresponding tracks 3r can be further prevented from contacting each other by contact between the two concave curved surfaces 3f and 3g and the convex curved surface 23s, for example.

In the present embodiment, for example, each of the weight members 3 has the concave curved surfaces 3f and 3g, and the convex curved surface 23s is shared by the concave curved surfaces 3f and 3g provided on the each of the weight members 3. Thus, according to the present embodiment, the protruding portion 23 and consequently the rotating member 2 can be readily formed in simpler shapes than in a configuration in which the rotating member 2 has the convex curved surface 23s corresponding to the concave curved surfaces 3f and 3g of the weight members 3, for example. Thus, for example, labor and cost needed for manufacturing the damper device 1 can be readily reduced.

Second Embodiment

Figure 7:
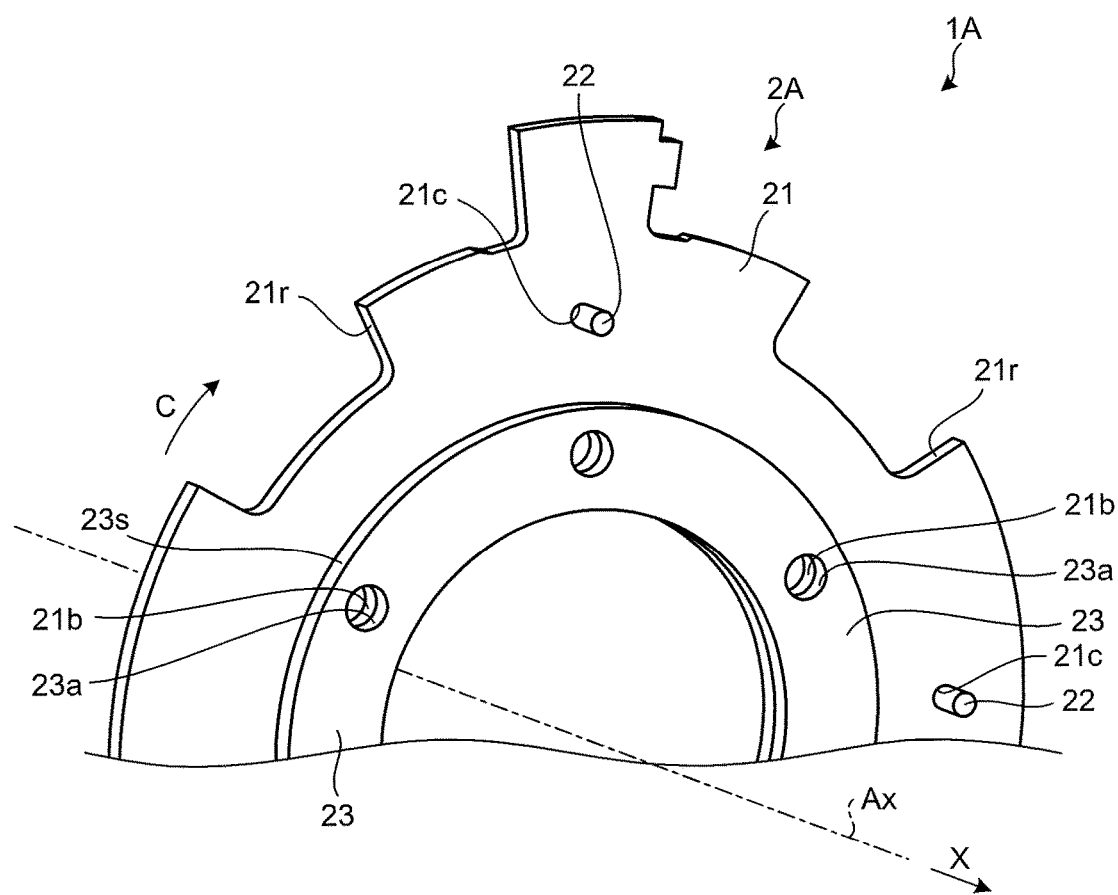
FIG. 7 is an exemplary perspective view of a part of a rotating member of a damper device according to a second embodiment.

A damper device 1A according to the present embodiment illustrated in FIG. 7 has similar configurations to the damper device 1 according to the above-described first embodiment. Thus, the present embodiment can also achieve similar results (effects) based on the similar configurations to the above-described first embodiment.

In the present embodiment, however, a plurality of openings 21r are provided in the base portion 21 of a rotating member 2A to be spaced apart from each other in the circumferential direction (the direction C), for example, as illustrated in FIG. 7. Each of the openings 21r is formed, for example, as a cutout that is open toward the outside in the radial direction of the base portion 21. The opening 21r penetrates the base portion 21 in the axial direction (the direction X) and extends in the circumferential direction. The couplers C1 (illustrated in FIGS. 1 and 2) for the weight members 3 are inserted through the openings 21r. In the present embodiment, each of the openings 21r is shared as a clearance hole by two or more of the couplers C1. Thus, according to the present embodiment, for example, the base portion 21 and consequently the rotating member 2A can be readily formed in simpler shapes than in a configuration in which the number of clearance holes provided in the base portion 21 corresponds to all of the couplers C1. Thus, for example, labor and cost needed for manufacturing the damper device 1A can be readily reduced.

Third Embodiment

Figure 8:
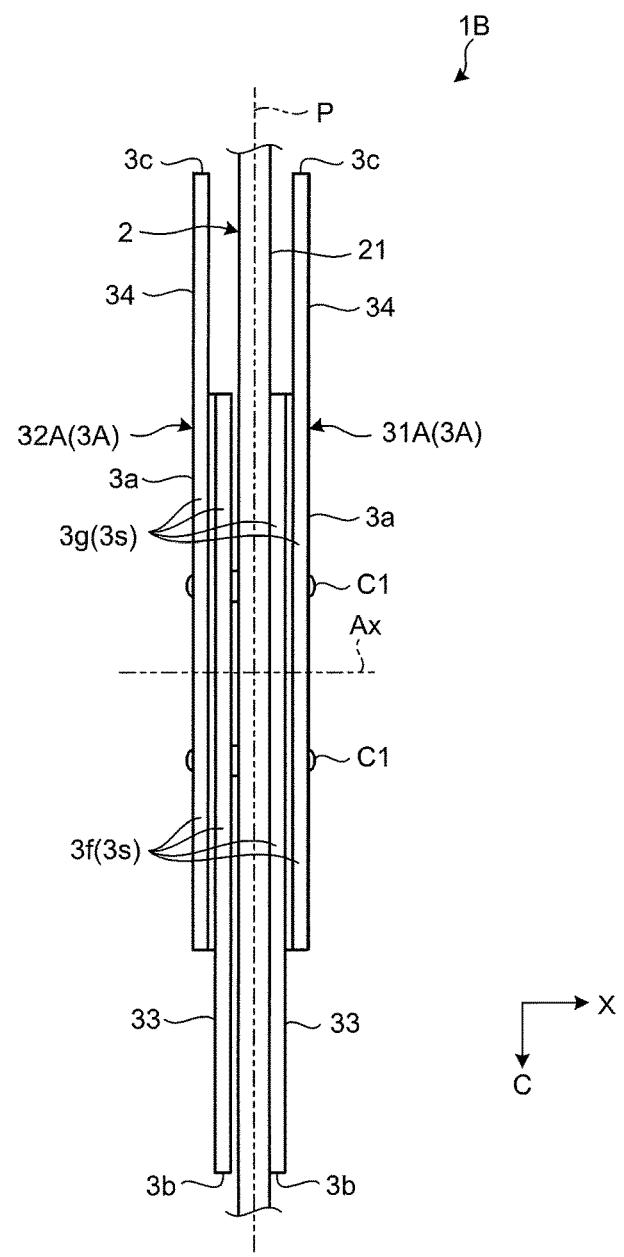
FIG. 8 is an exemplary plan view of a weight member of a damper device as viewed from the inside of the damper device in the radial direction thereof, according to a third embodiment.

A damper device 1B according to the present embodiment illustrated in FIG. 8 has similar configurations to the damper device 1 according to the above-described first embodiment. Thus, the present embodiment can also achieve similar results (effects) based on the similar configurations to the above-described first embodiment.

In the present embodiment, however, in a first weight member 31A positioned on one side of the damper device 1B in the axial direction (the direction X), the first component 33 is positioned closer to the other side thereof than the second component 34, for example, as illustrated in FIG. 8. Also, in a second weight member 32A positioned on the other side of the damper device 1B in the axial direction, the first component 33 is positioned closer to the one side than the second component 34 is, for example, as illustrated in FIG. 8. That is, in a weight member 3A, the first weight member 31A and the second weight member 32A are integrated with each other via the couplers C1 with the first component 33 and the second component 34 of the first weight member 31A in the axial direction being disposed in the axial direction in an order reverse to an order in which the first component 33 and the second component 34 of the second weight member 32A are disposed in the axial direction. This configuration brings the present embodiment to have: the first components 33 of the first weight member 31A and the second weight member 32A disposed plane-symmetric to each other with respect to a virtual plane P perpendicular to the rotational axis Ax and passing through the gravity center of the rotating member 2; and the second components 34 of the first weight member 31A and the second weight member 32A disposed likewise. Thus, the present embodiment enables, for example, the gravity centers of the first weight member 31A and the second weight member 32A to be disposed closer to a central part of the base portion 21 in the axial direction than otherwise. Thus, for example, vibration due to rotation of the damper device 1B is further less likely to occur. In the present embodiment, the first weight member 31A and the second weight member 32A are integrated with each other via the couplers C1 while having the first components 33 and the second components 34 overlapping in reverse orders in the axial direction, so that the position of the gravity center of the weight member 3A is prevented from changing. Consequently, vibration due to rotation of the damper device 1B is further less likely to occur. The first weight member 31A and the second weight member 32A need not be integrated with each other via the couplers C1.

While certain embodiments of the present invention have been described, these embodiments are merely examples and are not intended to limit the scope of the invention. These embodiments may be implemented in a variety of other forms. Furthermore, various omissions, substitutions, combinations, and changes may be made without departing from the spirit of the invention. These embodiments fall within the scope and spirit of the invention, as well as the scope of the invention as defined in the accompanying claims and the equivalents thereof. The present invention can also be achieved in configurations other than those disclosed in the embodiments and can produce various effects (including derivative effects) that can be produced by fundamental configurations (technical features). Additionally, the specifications (such as structure, type, direction, shape, size, length, width, thickness, height, quantity, layout, position, and material) of each constituent element may be changed as appropriate to be implemented.

EXPLANATIONS OF LETTERS OR NUMERALS 1, 1A, 1B: DAMPER DEVICE
2, 2A: ROTATING MEMBER
3: WEIGHT MEMBER
3a: INTERMEDIATE PORTION
3b, 3c: END PORTION
3f, 3g: CONCAVE CURVED SURFACE
3r: TRACK
21: BASE PORTION
22: SUPPORT PORTION
23: PROTRUDING PORTION
23s: CONVEX CURVED SURFACE
31, 31A: FIRST WEIGHT MEMBER
32, 32A: SECOND WEIGHT MEMBER
33: FIRST COMPONENT
34: SECOND COMPONENT
Ax: ROTATIONAL AXIS (ROTATIONAL CENTER)
C: CIRCUMFERENTIAL DIRECTION
R: RADIAL DIRECTION
X: AXIAL DIRECTION

The invention claimed is:

1. A damper device comprising:
a rotating member that is rotatable about a rotational center, the rotating member comprising
a base portion that is plate-like, and
a support portion that is attached to the base portion and extends in an axial direction of the rotational center; and
a plurality of weight members disposed partially overlapping each other in the axial direction, the weight members being provided with tracks in respective overlapped parts of the weight members, the tracks guiding the support portion to be swingable with respect to the rotating member, wherein
the support portion is shared in the tracks provided in the weight members.

2. The damper device according to claim 1, wherein
the weight members are disposed displaced from each other in a circumferential direction of the rotational center, and
the support portion is shared in the tracks provided in two of the weight members adjacent to each other in the circumferential direction.

3. The damper device according to claim 2, wherein
each of the weight members comprises
an intermediate portion that is positioned to one side of the base portion in the axial direction, and
two end portions that are formed thinner than the intermediate portion in the axial direction and extend to both sides in the circumferential direction from axially displaced positions in the intermediate portion, and
one of the two end portions on one side in the circumferential direction of one of the two adjacent weight members and the other one of the two end portions on the other side in the circumferential direction of the other one of the two adjacent weight members overlap each other in the axial direction.

4. The damper device according to claim 3, wherein
each of the weight members comprises
a first component that forms a part of the intermediate portion and the one of the two end portions on the one side in the circumferential direction, and
a second component that forms a part of the intermediate portion and the other one of the two end portions on the other side in the circumferential direction and that partially overlaps the first component in the axial direction, and
the first component and the second component are formed in shapes identical to each other.

5. The damper device according to claim 4, wherein
the plurality of weight members comprises
a plurality of first weight members that are disposed displaced from each other in the circumferential direction on one side in the axial direction of the base portion, and
a plurality of second weight members that are disposed side by side with the first weight members in the axial direction and displaced from each other in the circumferential direction on the other side in the axial direction of the base portion, and
in the first weight member and the second weight member that are disposed side by side in the axial direction, an order of arrangement of the first component and the second component of the first weight member in the axial direction and an order of arrangement of the first component and the second component of the second weight member in the axial direction are reverse to each other.

6. The damper device according to claim 1, wherein the rotating member comprises a protruding portion that protrudes from the base portion and comprises a convex curved surface formed as a cylindrical surface around the rotational center, at least one of the weight members comprises a concave curved surface that is capable of contacting and fitting the convex curved surface from outside in the radial direction of the rotational axis, and a range of movement of the support portion along the tracks is restricted by contact between the convex curved surface and the concave curved surface.

7. The damper device according to claim 6, wherein at least one of the weight members comprises, as the concave curved surface, two concave curved surfaces that are positioned displaced from each other in the circumferential direction of the rotational center, movement of the support portion toward one direction along the tracks is restricted by contact between the convex curved surface and one of the two concave curved surfaces, and movement of the support portion toward the other direction along the tracks is restricted by contact between the convex curved surface and the other one of the two concave curved surfaces.

8. The damper device according to claim 6, wherein the plurality of weight members comprises respective concave curved surfaces as the concave curved surface, and the convex curved surface is shared by the concave curved surfaces of the weight members.

* * * * *